United States Patent
Lee

(10) Patent No.: US 11,185,982 B2
(45) Date of Patent: *Nov. 30, 2021

(54) SERVING SYSTEM USING ROBOT AND OPERATION METHOD THEREOF

(71) Applicant: LG ELECTRONICS INC., Seoul (KR)

(72) Inventor: Don Geun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

This patent is subject to a terminal disclaimer.

(21) Appl. No.: 16/570,991

(22) Filed: Sep. 13, 2019

(65) Prior Publication Data

US 2020/0070344 A1 Mar. 5, 2020

(30) Foreign Application Priority Data

Aug. 8, 2019 (KR) .......................... 10-2019-0096745

(51) Int. Cl.
- *G06Q 50/12* (2012.01)
- *G05D 1/02* (2020.01)
- *B25J 9/16* (2006.01)

(52) U.S. Cl.
CPC ............. *B25J 9/1664* (2013.01); *B25J 9/163* (2013.01); *G05D 1/0274* (2013.01); *G06Q 50/12* (2013.01)

(58) Field of Classification Search
CPC .... G06Q 50/12; G05D 1/0268; G05D 1/0274; G05D 1/0234; G05D 1/0276; G01C 21/206

See application file for complete search history.

(56) References Cited

U.S. PATENT DOCUMENTS

| | | | | |
|---|---|---|---|---|
| 10,229,501 | B2* | 3/2019 | Kim | G06T 7/74 |
| 2013/0097038 | A1* | 4/2013 | Potter | G06Q 30/00 705/21 |
| 2016/0026705 | A1* | 1/2016 | Pesonen | H04W 4/029 707/737 |
| 2016/0217578 | A1* | 7/2016 | Can | G01C 19/5698 |
| 2017/0364074 | A1* | 12/2017 | Lau | G06Q 50/28 |
| 2018/0136615 | A1* | 5/2018 | Kim | G06N 20/10 |
| 2018/0202813 | A1* | 7/2018 | Belt | G01C 21/3652 |

(Continued)

FOREIGN PATENT DOCUMENTS

| KR | 1020170061355 | 6/2017 |
|---|---|---|
| KR | 1020170138977 | 12/2017 |

*Primary Examiner* — Ryan Rink
(74) *Attorney, Agent, or Firm* — Lee, Hong, Degerman, Kang & Waimey PC

(57) ABSTRACT

A serving system using a robot may include a caller mounted on each of a plurality of tables, and a robot driving to a target table among the plurality of tables based on information received from the caller. The robot may store information on the location of each of the plurality of callers, the size and shape of each of the plurality of tables, the location of the caller mounted on the table, and the rotational angle with respect to a baseline of the caller. The caller may transmit to the robot information on the distance from the caller to the robot and the direction of the robot with respect to the caller during driving of the robot. The robot may transmit and receive a wireless signal over a mobile communication network constructed according to 5G (Generation) communication.

15 Claims, 9 Drawing Sheets

(56) References Cited

U.S. PATENT DOCUMENTS

| | | | |
|---|---|---|---|
| 2018/0370728 A1* | 12/2018 | Gallagher | B25J 5/007 |
| 2019/0270204 A1* | 9/2019 | Kawamura | B25J 11/008 |
| 2019/0272580 A1* | 9/2019 | Kawamura | G06K 9/6202 |
| 2019/0275676 A1* | 9/2019 | Jensen | H04L 67/12 |
| 2020/0050995 A1* | 2/2020 | Ramanand | G06Q 10/1097 |
| 2020/0238523 A1* | 7/2020 | Ha | B25J 9/1676 |
| 2020/0249660 A1* | 8/2020 | Rao | G05B 19/41865 |
| 2020/0290208 A1* | 9/2020 | Ha | B25J 11/008 |
| 2020/0398437 A1* | 12/2020 | Hao | B25J 5/00 |

* cited by examiner

SERVING SYSTEM USING ROBOT AND OPERATION METHOD THEREOF

CROSS-REFERENCE TO RELATED APPLICATION

Pursuant to 35 U.S.C. § 119(a), this application claims the benefit of earlier filing date and right of priority to Korean Patent Application No(s). 10-2019-0096745, filed on Aug. 8, 2019, the contents of which are hereby incorporated by reference herein in its entirety.

BACKGROUND

1. Technical Field

The embodiment relates to a serving system using a robot and an operation method thereof, and more particularly, to a serving system using a robot and an operation method thereof, which have enhanced autonomous driving performance.

2. Description of Related Art

The content described in this section simply provides background information on the embodiments and does not constitute the related art.

The provision of service using a robot is spreading. In the service required for a customer in a restaurant, for example, ordering food, delivering the ordered food to the customer, etc., research is actively being conducted on the robot providing the service on behalf of a human employee.

In order for the robot to provide this service, the robot should be able to conduct an autonomous driving to a table with the calling customer. Accordingly, the autonomous driving may be required for a service robot used in a restaurant.

Meanwhile, in order for the robot to conduct the autonomous driving, the robot should confirm its current location while driving, and needs to recognize the features around its driving route.

For this purpose, the robot needs to perform Simultaneous Localization And Mapping (SLAM).

In general, in order for an autonomous driving robot to perform the SLAM, the robot confirms the surrounding features by using a sensing means such as a Light Detection And Ranging (LiDAR) apparatus provided by the robot, and performs the SLAM based on the confirmed result.

However, this typical SLAM process may require excessive operation and data processing by the robot, and require apparatuses such as many sensing means for accurate results. This causes inefficiency.

Accordingly, in order to perform a simple, fast, and accurate SLAM, it is necessary to consider a method for providing a sensing means in another apparatus outside the autonomous driving robot and performing the SLAM by using this sensing means.

Korean Patent Laid-Open Publication No. 10-2017-0061355 discloses a configuration of tracking the location of a mobile robot by analyzing an image captured from a camera, and increasing the accuracy of SLAM.

Korean Patent Laid-Open Publication No. 10-2017-0138977 discloses a configuration of applying odometry information obtained in a moving process of a walking robot to an image-based SLAM technology.

However, these documents do not disclose a method for providing the sensing means in another apparatus outside the autonomous driving robot, and performing the SLAM by using the sensing means.

SUMMARY OF THE DISCLOSURE

An aspect of an embodiment is to provide a serving system using a robot and an operation method thereof, which have a configuration of providing a sensing means in another apparatus outside an autonomous driving robot, and performing a SLAM by using the sensing means.

Another aspect of an embodiment is to provide a method for confirming information on the distance from a plurality of sensing means provided outside a robot to the robot and the direction of the robot, and performing, by the robot, a SLAM based on the information.

Still another aspect of an embodiment is to provide a method for forming a map and a driving route for autonomous driving of a robot by using a plurality of sensing means provided outside the robot.

The objectives to implement in the embodiments are not limited to the technical objectives described above, and other objectives that are not stated herein will be clearly understood by those skilled in the art from the following specifications.

For achieving the objects, a serving system using a robot may include a caller mounted on each of a plurality of tables, and a robot driving to a target table among the plurality of tables based on information received from the caller.

The robot may store information on the location of each of the plurality of callers, the size and shape of each of the plurality of tables, the location of the caller mounted on the table, and the rotational angle with respect to a baseline of the caller.

The caller may transmit to the robot information on the distance from the caller to the robot and the direction of the robot with respect to the caller during driving of the robot.

The caller may include a bell switch for calling the robot, a positioning sensor for sensing the distance to the robot and the direction of the robot, and sensing the distance to each of the callers and the direction of each of the callers, a magnetic sensor for sensing whether it rotates and the rotational angle thereof, and a communicator connected with the bell switch, the positioning sensor, and the magnetic sensor, and for communicating with the robot.

The positioning sensor may be provided as an Ultra Wide Band (UWB) sensor.

The robot may generate a map including the arrangement state of each of the tables from the stored information.

The robot may generate the driving route for going to the caller based on the generated map, when receiving a calling signal from the caller.

The robot may generate the map by combining the coordinates of the caller, the size and shape of the table, and the rotational angle with respect to the baseline of the caller, which are derived from the stored information.

The robot may confirm its current location based on information on the distance from the caller to the robot and the direction of the robot with respect to the caller during driving.

The caller may transmit to the robot information on the location of an obstacle appearing on the driving route of the robot.

The caller may transmit to the robot information on the distance from the caller to the obstacle and the direction of the obstacle with respect to the caller.

The robot may confirm the changed arrangement of the table by receiving information on at least one of a change in the location of the caller or the rotational angle with respect to the baseline from the caller.

The robot may store information on the changed arrangement of the table.

The robot may include an inputter, and the robot may set a target table among the plurality of tables and generate a driving route according to the content input to the inputter or a call of the caller.

A method for operating a serving system using a robot may include setting, by a robot, a target table among a plurality of tables, generating, by the robot, a map for driving based on the stored information, generating, by the robot, a driving route on the map, driving, by the robot, along the generated driving route, and confirming, by the robot, its current location based on information received from a caller provided on the plurality of tables, respectively, during driving.

The robot may store information on the location of each of the plurality of callers, the size and shape of each of the plurality of tables, the location of the caller mounted on the table, and the rotational angle with respect to a baseline of the caller.

The caller may transmit to the robot information on the distance from the caller to the robot and the direction of the robot with respect to the caller during driving of the robot.

The robot may confirm the changed arrangement of the table by receiving information on at least one of a change in the location of the caller or the rotational angle with respect to the baseline from the caller, and store the information on the changed arrangement of the table.

The caller may transmit to the robot information on the distance from the caller to an obstacle appearing on the driving route of the robot and the direction of the obstacle with respect to the caller, and the robot may store the information on the obstacle received from the caller.

Unlike the general autonomous driving method in which the driving robot performs the SLAM by itself, in an embodiment, the callers which are provided in plural and located at locations different from each other, respectively may confirm the features around the robot and confirm the location of the robot.

According to this structure, it is possible for the robot to reduce the operation and data processing time, and the occurrence of the overload caused by the above, compared to the case of performing the SLAM alone, thereby significantly reducing the operation error during the autonomous driving of the robot caused by the above.

In an embodiment, it is possible to sense the location by using the UWB sensor, thereby performing the SLAM for autonomous driving of the robot at low cost without harming the human body.

In addition, it is possible for each UWB sensor to confirm the information on the locations of the robot and other UWB sensors by using the plurality of UWB sensors, thereby performing a very accurate SLAM.

DETAILED DESCRIPTION

Hereinafter, the embodiments will be described in detail with reference to the companying drawings.

Advantages and features of the present disclosure and methods for achieving them will become apparent from the descriptions of aspects herein below with reference to the accompanying drawings.

However, the present disclosure is not limited to the aspects disclosed herein but may be implemented in various different forms. The aspects are provided to make the description of the present disclosure thorough and to fully convey the scope of the present disclosure to those skilled in the art.

It is to be noted that the scope of the present disclosure is defined only by claims. Although the terms first, second, third, etc. may be used herein to describe various elements, components, regions, layers and/or sections, these elements, components, regions, layers and/or sections should not be limited by these terms.

Terms such as "first," "second," and other numerical terms when used herein do not imply a sequence or order unless clearly indicated by the context. These terms are generally only used to distinguish one element from another. Thus, a first element, component, region, layer or section discussed below could be termed a second element, component, region, layer or section without departing from the teachings of the example embodiments.

In the following description, when an element is described as being formed "on (over)" or "beneath (under)" another element, the element includes two elements that are in direct contact with each other, or one or more other elements located indirectly between the two elements. Terms formed "on (over)" or "beneath (under)" may denote not only the upward direction from one element but the downward direction.

The relational terms used in the following description such as "on/upper/over" and "beneath/lower/under" may be used to discriminate any one subject or component from another subject or component without necessarily requiring or including any physical or logical relationship of corresponding subjects or components.

Figure 1:
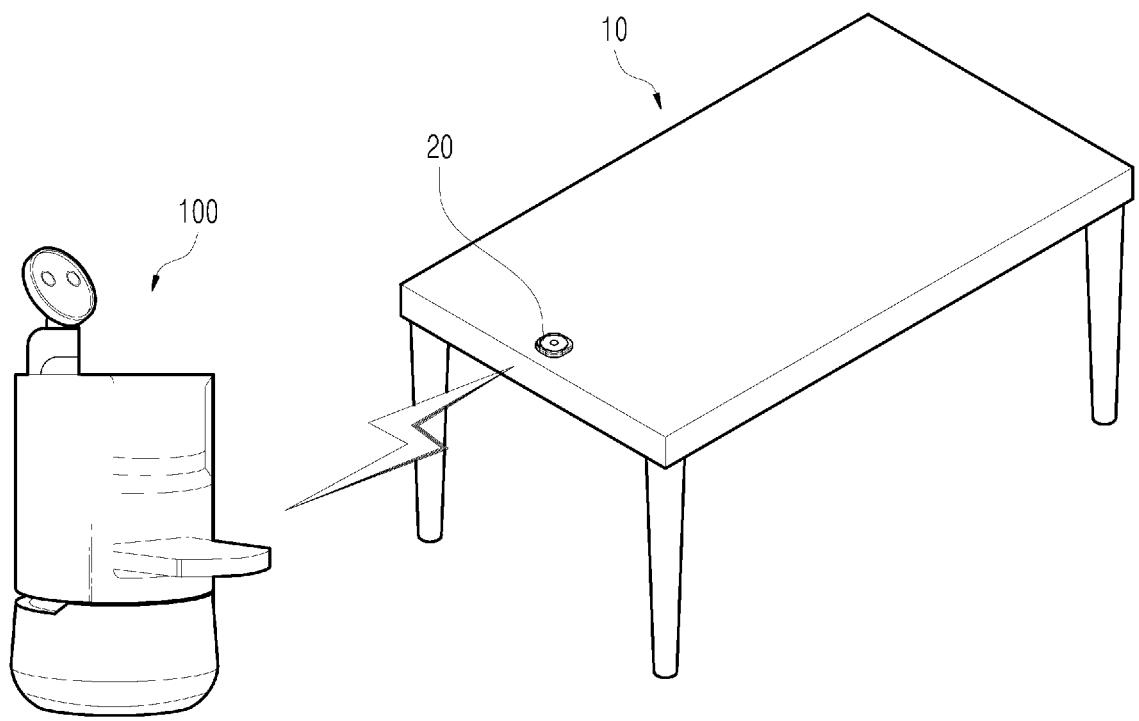
FIG. 1 is a diagram for explaining a serving system using a robot according to an embodiment.

FIG. 1 is a diagram for explaining a serving system using a robot according to an embodiment.

A robot may mean a machine for automatically handling or operating a given task by its own ability. In particular, a robot having a function of recognizing the environment, and determining by itself to perform an operation may be referred to as an intelligent robot.

The robot may be classified into an industrial use, a medical use, a household use, a military use, etc. according to the purpose or field of use.

The robot may include a driving unit including an actuator or a motor to perform various physical operations such as moving a robot joint. In addition, the movable robot may include a wheel, a brake, a propeller, etc. in the driving unit to drive on the ground or fly in the air through the driving unit.

In an embodiment, a robot 100 may be, for example, a robot 100 located in a restaurant, etc. to serve for the convenience of a customer. In an embodiment, the present disclosure may relate to a serving system using the serving robot 100.

The serving robot 100 of the embodiment may be used in a home and other various places in addition to the restaurant, but for clarity, the robot 100 used in the restaurant will be described in detail below.

The robot 100 is capable of autonomous driving, and may include a communication apparatus to communicate with a caller 200 mounted on a table 10 provided in the restaurant. In addition, the robot 100 may wirelessly communicate with a server to receive various information from the server, and update this information.

The autonomous driving means a technology of driving by itself, and an autonomous driving vehicle means a vehicle for driving without a user's operation or with minimal operation of the user.

For example, the autonomous driving may include all of a technology of maintaining a driving lane, a technology of automatically adjusting a speed such as an adaptive cruise control, a technology of automatically driving along a predetermined route, a technology of automatically setting the route when a target is set and driving, etc.

The vehicle includes all of a vehicle having only an internal combustion engine, a hybrid vehicle having the internal combustion engine and an electric motor together, and an electric vehicle having only the electric motor, and may include not only the vehicle but also a train, a motorcycle, etc.

At this time, the autonomous driving vehicle may be regarded as the robot 100 having an autonomous driving function.

An embodiment may relate to extended reality. The extended reality collectively refers to Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

The robot 100 may drive to each table 10 to provide food to a customer, or provide any convenience for meal to the customer, such as ordering of the customer or guiding the customer.

For example, the robot 100 may communicate with the caller 200 by using a short-range communication means such as Wi-Fi or Bluetooth, and may be connected to the server by wire.

In another embodiment, the robot 100 may be configured to include at least one of a mobile communication module and a wireless internet module for communication with the caller 200 or the server. In addition, the robot 100 may further include a short-range communication module.

The mobile communication module may transmit and receive a wireless signal with at least one of a base station, an external terminal, and a server on a mobile communication network according to the technology standards or the communication method for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G mobile communication, etc.).

The wireless Internet module, as a module for wireless Internet access, may be mounted in or outside the robot 100. The wireless Internet module may transmit and receive the wireless signal in a communication network in accordance with wireless Internet technologies.

The robot 100 may transmit and receive data to and from the server and the terminal capable of performing various communications through a 5G network. In particular, the robot 100 may perform data communications with the server and the terminal by using at least one network service among enhanced mobile broadband (eMBB), ultra-reliable and low latency communications (URLLC), and massive machine-type communications (mMTC).

The eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the large-volume traffic may be accommodated in an area where user mobility is low and user density is high. Through broadband coverage, a wide-range and stable wireless environment and user mobility may be guaranteed.

The URLLC service defines the requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. A much larger number of terminals, such as sensors, than a general portable phone may be connected to a wireless access network by mMTC at the same time. The communication module of the terminal 300 should be inexpensive, and there is a need for improved power efficiency and power saving technology capable of operating for years without battery replacement or recharging.

An artificial intelligence technology may be applied to the robot 100. Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The caller 200 may be mounted on each of a plurality of tables 10, and a customer occupying the table 10 may call the robot 100 by pressing a bell switch 210 of the caller 200.

The robot 100 may receive a calling signal from the caller 200. The robot 100 may drive to a target table 10 of the plurality of tables 10 based on the information received from the caller 200. For example, when receiving a call, the robot 100 may target the table 10 in which the caller 200 is located, and go to the target table 10 by autonomous driving.

The robot 100 may hold a map necessary for autonomous driving, and generate a driving route for going to the target table 10 from the current location by using the map.

In order for the robot 100 to go to the target table 10 along the driving route, the robot 100 needs to always confirm its current location during driving, and may perform the task for generating the map by confirming the surrounding features in order to confirm the current location.

That is, for the autonomous driving, the robot 100 may simultaneously perform the map generation for its own location estimation and autonomous driving. That is, the robot 100 may perform a Simultaneous Localization and Mapping (SLAM). Since the SLAM itself is well known as the known technology, the description of the specific technical content will be omitted.

The robot 100 may update the map previously stored with a map newly generated by SLAM. According to the map update using the SLAM, the robot 100 may effectively cope with the occurrence of a new obstacle 30-1 on the driving route, a change in the driving route, etc.

In the autonomous driving field, the robot 100 generally performs the SLAM by a method for generating a map by confirming the surrounding situation at the current location during driving, and confirming its current location on the generated map.

Typically, the performing the SLAM confirms the surrounding features by using a sensing means such as a Light Detection And Ranging (LiDAR) apparatus included in the robot 100, and performs the SLAM based on the confirmed result.

However, this typical SLAM process may require excessive operation and data processing by the robot 100, and require apparatuses such as many sensing means for accurate results. This causes inefficiency.

In addition, in order to avoid excessive operation and data processing of the robot 100, when the SLAM is performed in a separate server for communicating with the robot 100, delay of the operation and data processing and a malfunction of the robot 100 may be caused, such that this also causes inefficiency.

Accordingly, an embodiment provides a serving system capable of SLAM effectively by using the caller 200 as a sensing means when the robot 100 capable of communicating with the caller 200 performs the SLAM.

The robot 100 may store the information on the location of each of the plurality of callers 200, the size and shape of each of the plurality of tables 10, the location of the caller 200 mounted on the table 10, and the rotational angle with respect to the baseline of the caller 200.

The location of each of the callers 200 may be transmitted from the respective callers 200 to the robot 100. That is, the caller 200 may transmit to the robot 100 the information on the distance to the robot 100 and the direction of the robot 100 confirmed based on itself, and the robot 100 may confirm the location of the caller 200 therefrom.

The information on the size and shape of each of the tables 10 may be input to the robot 100 by the user, and if there is a change in the size and shape of the table 10, the user may update it to the robot 100.

Likewise, the location of the caller 200 mounted on the table 10 may also be input to the robot 100 by the user, and if there is a change therefor, the user may update it to the robot 100.

The information on the rotational angle with respect to the baseline of the caller 200 may be confirmed by the caller 200, and the caller 200 may transmit the confirmed information to the robot 100. The change in the rotational angle may mean that the arrangement of the table 10 in the restaurant is changed by rotating the table 10.

The robot 100 may update the map for setting the driving route by confirming the information on the rotational angle to confirm the change in the location of the table 10 in the restaurant. This will be described in detail below.

The caller 200 may transmit to the robot 100 the information on the distance from the caller 200 to the robot 100 and the direction of the robot 100 with respect to the caller 200 upon driving of the robot 100.

That is, the plurality of callers 200 may transmit to the robot 100 the information by which the robot 100 may confirm its current location during driving of the robot 100, and the robot 100 may confirm its current location on the map generated for driving based on the received information.

In addition, the caller 200 may confirm the features around the current location of the robot 100, transmit the confirmed result to the robot 100, and the robot 100 may update the existing map by generating a map in real time based on the received result. This will be described later in detail.

Unlike the general autonomous driving method in which the driving robot 100 performs a SLAM by itself, in an embodiment, the callers 200, which are provided in plural and located at locations different from each other, respectively, may confirm the features around the robot 100 and confirm the location of the robot 100.

According to this structure, it is possible for the robot 100 to reduce the operation and data processing time and the occurrence of overload caused by the above, compared to the case of performing the SLAM alone, thereby significantly reducing the operation error during the autonomous driving of the robot 100 caused by the above.

Figure 2:
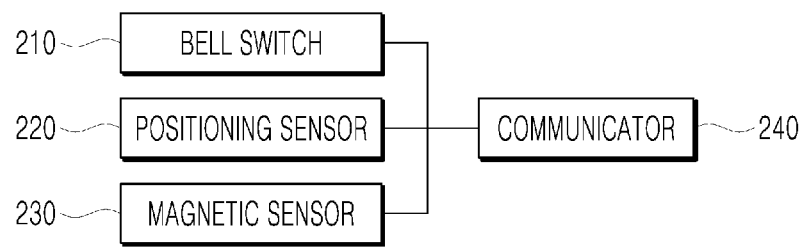
FIG. 2 is a diagram for explaining a caller according to an embodiment.
Figure 3A:
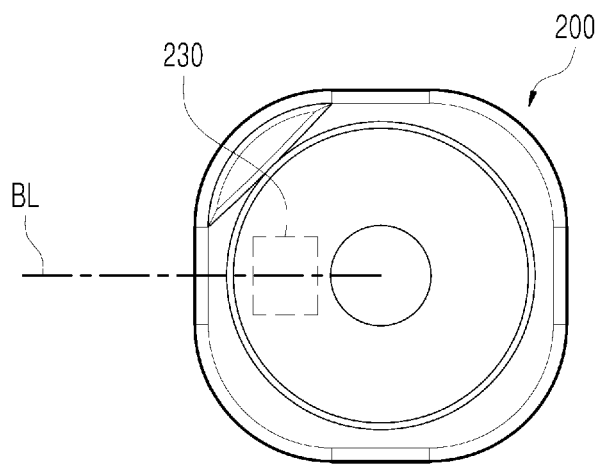
FIGS. 3A and 3B are diagrams for explaining an operation of a magnetic sensor provided in the caller according to an embodiment.
Figure 3B:
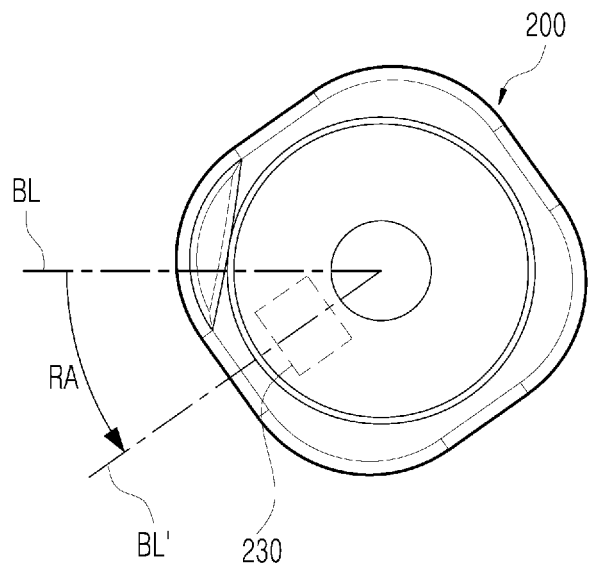

FIG. 2 is a diagram for explaining a caller 200 according to an embodiment. FIGS. 3A and 3B are diagrams for explaining an operation of a magnetic sensor 230 provided in the caller 200 according to an embodiment. The caller 200 may include a bell switch 210, a positioning sensor 220, a magnetic sensor 230, and a communicator 240.

The communicator 240 may be connected with the bell switch 210, the positioning sensor 220, and the magnetic sensor 230, and provided for communication with the robot 100. The caller 200 may transmit and receive necessary information and data with the robot 100 through the communicator 240.

The bell switch 210 may call the robot 100. A customer may call the robot 100 by pressing the bell switch 210, and the robot 100 may receive an alarm generated when the bell switch 210 is pressed to specify the caller 200 called by the customer, and perform autonomous driving to go to the table 10 on which the specified caller 200 has been mounted.

The positioning sensor 220 may sense the distance to the robot 100 and the direction of the robot 100 with respect to the caller 200. In addition, the positioning sensor 220 may sense the distance to each of the other callers 200 and the direction of each of the callers 200 with respect to its own.

The positioning sensor 220 may transmit a signal, and confirm the distance to the sensed object and the direction in which the sensed object is located by calculating the time until the signal returns.

For example, if the robot 100 and the two positioning sensors 220 are present, one positioning sensor 220 may confirm the distance and direction for the robot 100 and the other positioning sensor 220, and the latter other positioning sensor 220 may also confirm the distance and direction for the robot 100 and the former positioning sensor 220.

Based on the information on the distance and the direction, for example, through the triangulation, it is possible to confirm the locations of the robot 100 and the two positioning sensors 220. Accordingly, one positioning sensor 220 may confirm the distance and direction of the other positioning sensors 220 and the robot 100.

The robot 100 may receive the information on the distance and direction confirmed from all positioning sensors 220, and confirm the locations of all positioning sensors 220 based on the received information.

For example, the positioning sensor 220 may be provided as a UWB sensor. The UWB sensor may transmit a broadband wireless signal, and confirm the distance to the object and the direction of the object by calculating the time when the transmitted wireless signal hits the object and returns.

Compared to a LiDAR sensor, the UWB sensor is simpler to configure, less expensive, and has less impact on the human body. Accordingly, it is possible to sense the location by using the UWB sensor in a restaurant with many customers, thereby performing the SLAM for autonomous driving of the robot 100 at low cost without harming the human body.

In addition, it is possible for each UWB sensor to confirm the information on the locations of the robot 100 and other UWB sensors by using the plurality of UWB sensors, thereby performing a very accurate SLAM.

The magnetic sensor 230 may sense whether the caller 200 rotates and the rotational angle thereof by sensing whether the magnetic sensor 230 rotates and the rotational angle thereof. The magnetic sensor 230 may sense whether the magnetic sensor 230 rotates and the rotational angle thereof by confirming a slight change in the direction and magnitude of the earth magnetic field generated when the magnetic sensor 230 rotates.

Referring to FIGS. 3A and 3B, when the caller 200 rotates to become a state FIG. 3B from a state FIG. 3A, the rotational angle formed by a line BL' rotated from a baseline and the baseline BL becomes RA counterclockwise from the baseline BL.

The magnetic sensor 230 provided in the caller 200 may confirm the rotational angle RA by confirming a change in the direction and magnitude of the earth magnetic field by rotating together when the caller 200 rotates.

The caller 200 may confirm the rotational angle through the magnetic sensor 230, accordingly, confirm the rotational angle of the table 10 on which the caller 200 has been mounted, and transmit the information on the rotational angle of the table 10 to the robot 100.

The robot 100 may perform the update reflecting such a change to the map for autonomous driving when the location of the table 10 is changed, based on the information on the rotational angle received from the caller 200, and the change in the location of the caller 200 also received from the caller 200. This will be described below in detail with reference to FIGS. 6A, 6B, 6C, etc.

Figure 4A:
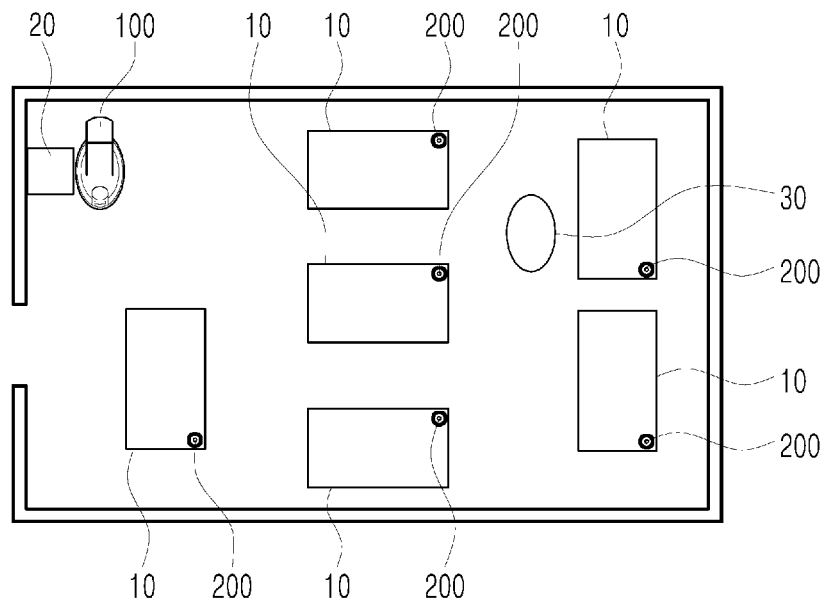
FIGS. 4A, 4B, and 4C are diagrams for explaining an operation of the serving system using the robot according to an embodiment.
Figure 4B:
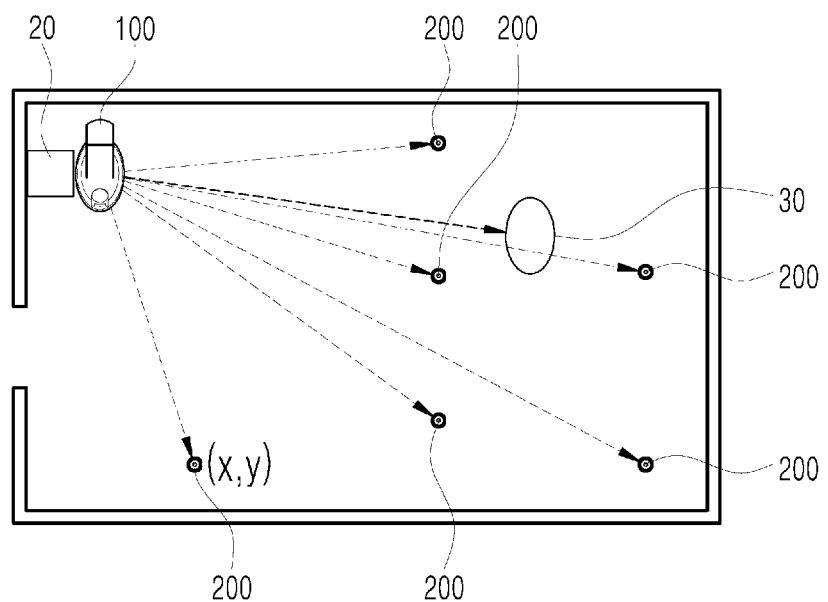
Figure 4C:
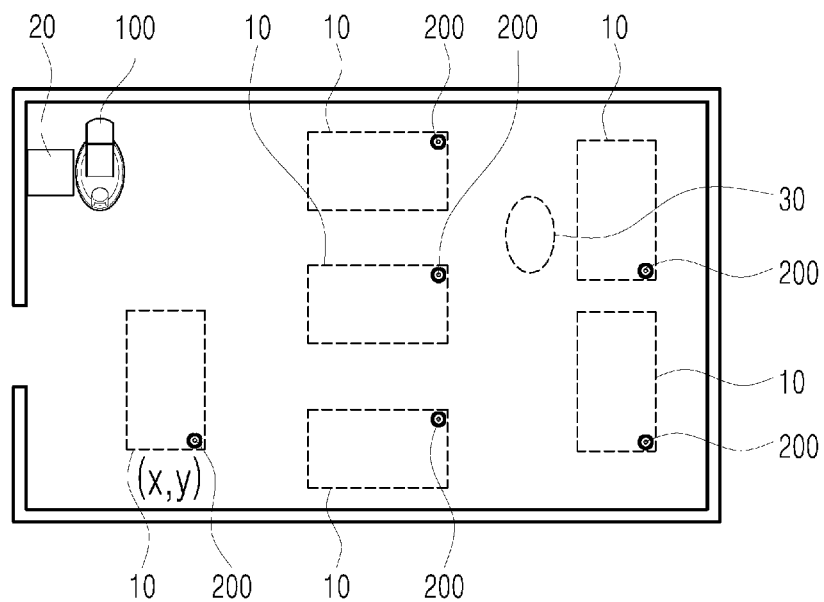
Figure 5A:
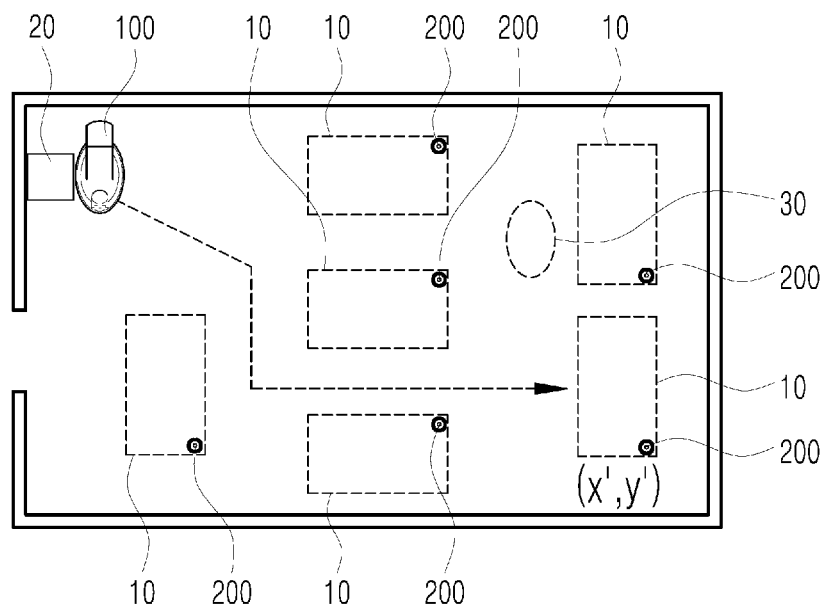
FIGS. 5A, 5B and 5C are diagrams for explaining an operation of the serving system using the robot according to another embodiment.
Figure 5B:
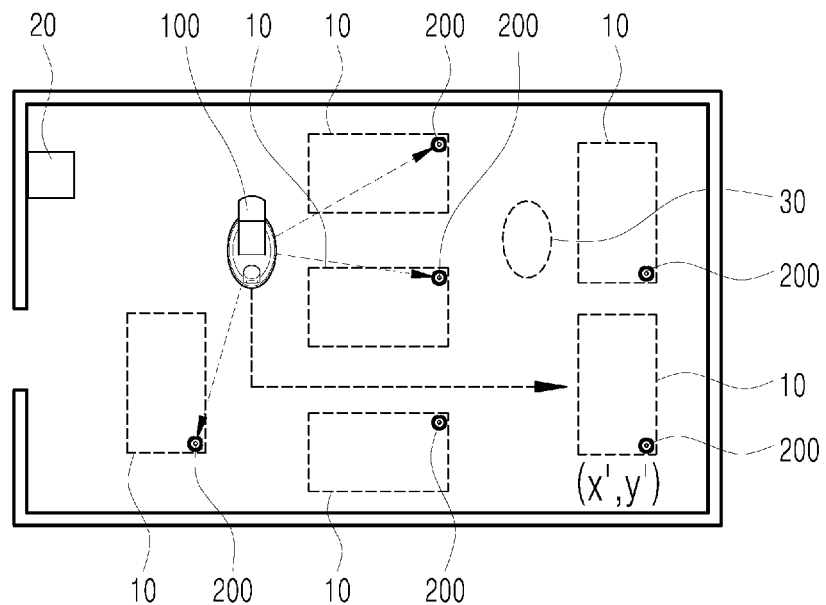
Figure 5C:
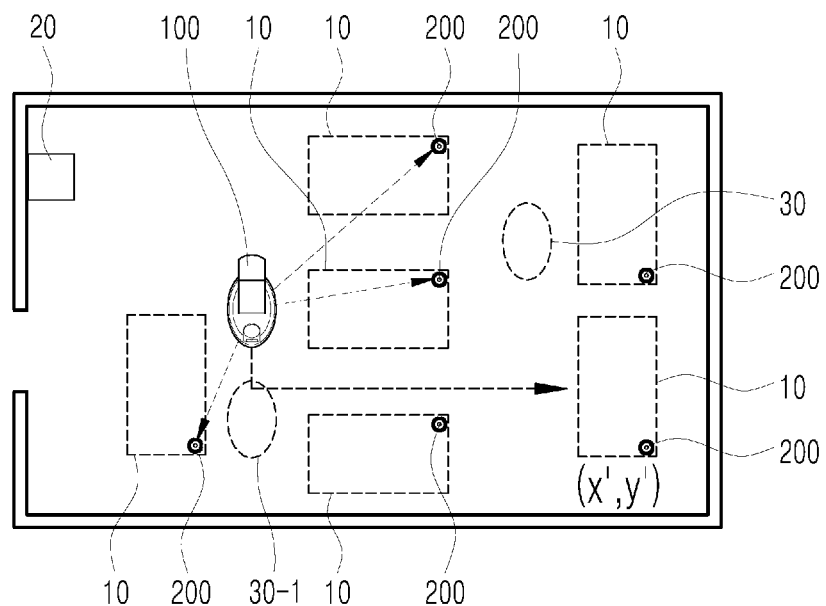
Figure 6A:
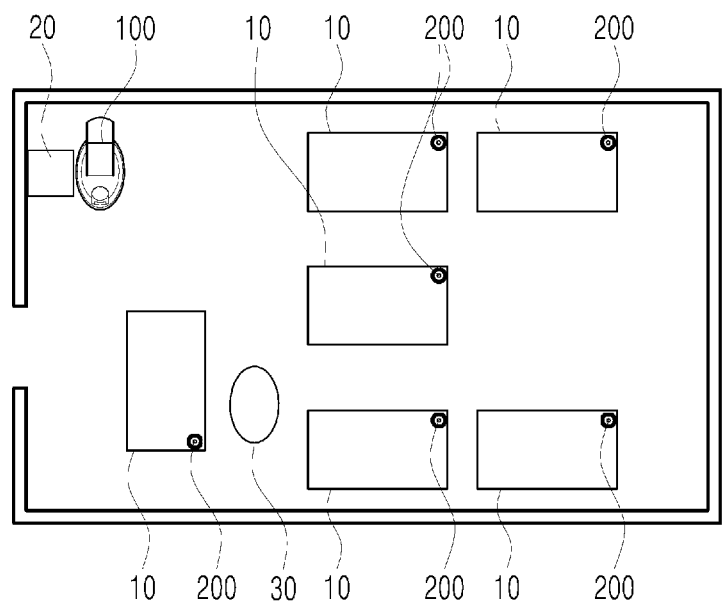
FIGS. 6A, 6B and 6C are diagrams for explaining an operation of the serving system using the robot according to another embodiment.
Figure 6B:
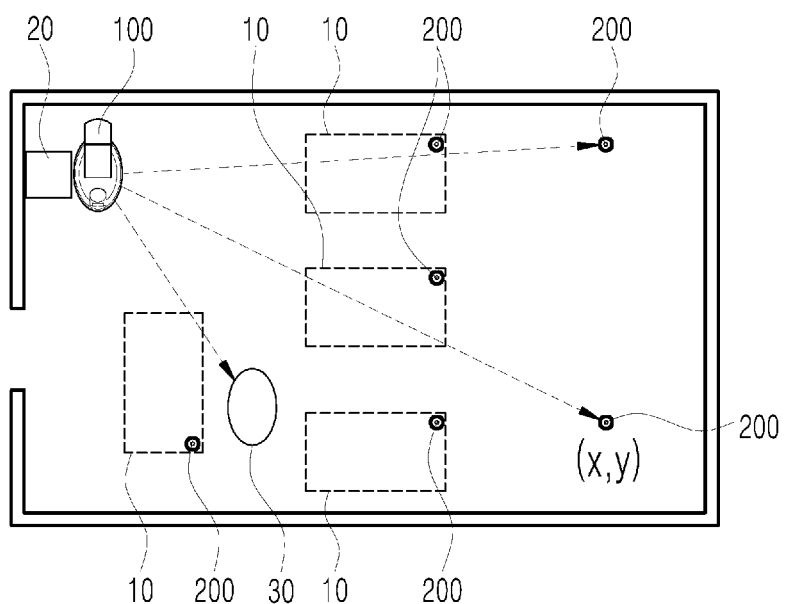
Figure 6C:
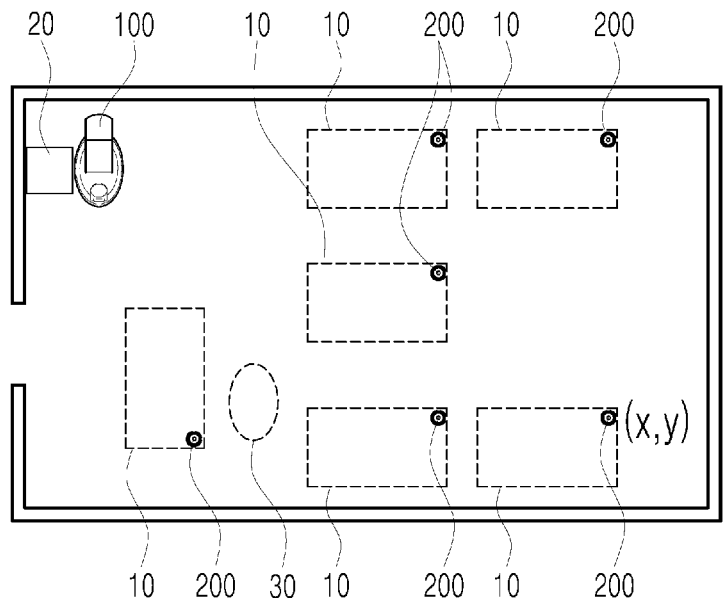

FIGS. 4A, 4B and 4C are diagrams for explaining an operation of the serving system using the robot 100 according to an embodiment. FIGS. 5A, 5B and 5C are diagrams for explaining an operation of the serving system using the robot according to another embodiment. FIGS. 6A, 6B and 6C are diagrams for explaining an operation of the serving system using the robot according to another embodiment. First, a process of generating a map for autonomous driving of the robot 100 will be described with reference to FIGS. 4A, 4B, 4C, 5A, 5B and 5C.

FIG. 4A illustrates an example in which the plurality of tables 10 and the caller 200 are located in a restaurant. The restaurant may be prepared with a charging apparatus 20 for charging the robot 100, and the robot 100 may wait in a location close to the charging apparatus 20.

The robot 100 may generate a map including the arrangement state of each table 10 from the stored information. At this time, as described above, the stored information may be information on the location of each of the plurality of caller 200, the size and shape of each of the plurality of tables 10, the position of the caller 200 mounted on the table 10, and the rotational angle with respect to the baseline of the caller 200.

The robot 100 may generate the map by combining the coordinates of the caller 200 derived from the stored information, the size and shape of the table 10, and the rotational angle with respect to the baseline of the caller 200.

That is, the robot 100 may confirm the location of the table 10 based on the information. Referring to FIG. 4B, for example, the coordinates of the charging apparatus 20 may be represented as (0, 0), and the coordinates of each caller 200 may be represented as (x, y). The robot 100 may draw the location of each table 10 with the information on the size and shape of the table 10 stored in the coordinates of the caller 200, the location of the caller 200 mounted on the table 10, and the rotational angle with respect to the baseline of the caller 200. The map created in this method is illustrated in FIG. 4C.

Referring again to FIG. 4B, the caller 200 may confirm information on the location of an obstacle 30 in a restaurant capable of disturbing the driving of the robot 100, and transmit the confirmed information to the robot 100.

The confirming the location of the obstacle 30 may be similar to the above-described method for confirming the location of the table 10. The caller 200 may confirm the distance to the obstacle 30 and the direction of the obstacle 30 with respect to the positioning sensor 220.

From the distance to the obstacle 30 and the direction information of the obstacle 30 confirmed by at least two callers 200, the robot 100 may confirm the location of the obstacle 30 by a triangulation method, represent the location of the obstacle 30 as coordinates, and as illustrated in FIG. 4C, display the obstacle 30 on the map.

Hereinafter, a method in which the robot 100 generates a driving route, and drives along the driving route will be described with reference to FIGS. 5A, 5B and 5C.

FIG. 5A illustrates a state where the robot 100 has generated the driving route on the map. FIG. 5B illustrates a state where the robot 100 drives along the generated driving route. When receiving the call signal from the caller 200, the robot 100 may generate the driving route for going to the caller 200 from which the robot 100 received the call signal based on the generated map.

As illustrated in FIG. 5A, for example, when receiving a call from the caller 200 located at (x', y'), the robot 100 may generate the driving route capable of avoiding the obstacle 30 and going to the table 10 from which the robot 100 received the call based on the generated map according to the information already held. The generated driving route is illustrated by an arrow in FIG. 5A.

The robot 100 may confirm its current location based on the information on the distance from the caller 200 to the robot 100 and the direction of the robot 100 with respect to the caller 200 when driving.

Referring to FIG. 5B, the robot 100 drives along the driving route. At this time, the caller 200 located in each table 10 may confirm the information on the distance to the driving robot 100 and the direction of the robot 100 with respect to its own, and transmit the confirmed information to the robot 100.

The robot 100 may confirm its current location in real time, for example, through triangulation, based on the information received from the plurality of callers 200. Meanwhile, in the same method, the caller 200 may transmit information on the locations of the obstacle 30 and other features appearing around the robot 100 at the current location of the driving robot 100 to the robot 100, and the robot 100 may confirm the information on the features therefrom.

FIG. 5C illustrates a case where a new obstacle 30-1 appears during driving of the robot 100. Referring to FIG. 5C, the new obstacle 30-1 may appear on the driving route of the robot 100. At this time, the caller 200 may transmit to the robot 100 information on the location of the new obstacle 30-1 appearing on the driving route of the robot 100.

That is, the caller 200 may transmit information on the distance from the caller 200 to the obstacle 30 and the direction of the new obstacle 30-1 with respect to the caller 200 to the robot 100.

The robot 100 may reflect it to the driving by recognizing the location of the new obstacle 30-1 from the received information. If the new obstacle 30-1 blocks the existing driving route, the robot 100 may set a new driving route that avoids the new obstacle 30-1.

The robot 100 may update the map for autonomous driving by adding the information on the location of the new obstacle 30-1 to the previously generated map.

The robot 100 may perform the SLAM by confirming the current location during driving and the features on the driving route in the method described above.

Hereinafter, a process of correcting the map for autonomous driving will be described with reference to FIGS. 6A, 6B and 6C.

FIG. 6A illustrates an example in which the plurality of tables 10 and the caller 200 have been arranged in a restaurant, and the locations of the obstacle 30 and some tables 10 are changed compared to FIG. 4A.

Each caller 200 may confirm information on a change in the location of itself or another caller 200, and the rotational angle with respect to the baseline. The change in the location of the caller 200 may be confirmed by the positioning sensor 220, and the rotational angle may be confirmed by the magnetic sensor 230, respectively.

The robot 100 may confirm the changed arrangement of the table 10 by receiving information on at least one of the change in the location of the caller 200 or the rotational angle with respect to the baseline from the caller 200.

Referring to FIG. 6B, the robot 100 may confirm the location of the caller 200 at the changed (x, y) point based on the information received from the plurality of callers 200, for example, by triangulation.

Since the robot 100 already knows the location of the caller 200 in the table 10, the robot 100 may confirm the changed location of the table 10 by combining the location of the caller 200 in the table 10, and the changed location and rotational angle of the caller 200.

In addition, each caller 200 may also confirm information on a change in the location of the obstacle 30 by the positioning sensor 220. The robot 100 may receive the information on the changed location of the obstacle 30 from the plurality of callers 200, and confirm the changed location of the obstacle 30 based on the received information, for example, by triangulation.

The map corrected in the above-described method has been illustrated in FIG. 6C. The robot 100 may store the information on the changed arrangement of the table 10, and the information on the changed location of the obstacle 30.

Based on the updated information, the robot 100 may update the map for autonomous driving, and generate a driving route based on the updated map.

Meanwhile, the robot 100 may include an inputter. The customer or employee of the restaurant may instruct the robot 100 in a desired command through the inputter. For example, the inputter may be provided as a text input interface through which a customer or an employee may input by hand, or provided as a voice recognition interface through which a customer or an employee may input by voice.

The robot 100 may set a target table 10 among the plurality of tables 10 and generate a driving route according to the content input to the inputter or a call of the caller 200.

As described above, the robot 100 may go to a specific table 10 by a command through the inputter of the customer or the employee, in addition to the case where the customer calls through the caller 200.

Even at this time, as in the above-described case of the call through the caller 200 of the customer, the robot 100 may generate a map for autonomous driving to the target table 10, set the driving route on the map, and drive along the driving route.

The robot 100 may return from the table 10 to an original location, for example, a location close to the charging apparatus 20. Even in the case of return, the robot 100 may conduct the autonomous driving for return in a method similar to the above-described method.

That is, the robot 100 may receive the information on the locations of the caller 200 and the obstacle 30 from the plurality of callers 200, generate the map for autonomous driving for going to the original location based on the received information, generate the driving route on the map, and return to the original location along the driving route.

Figure 7:
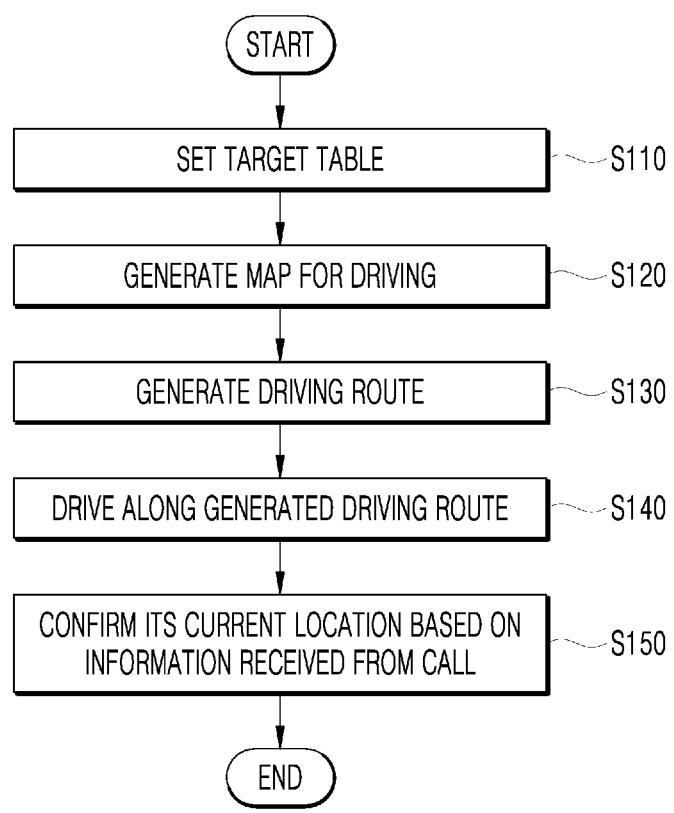
FIG. 7 is a flowchart illustrating an operation method of the serving system using the robot according to an embodiment.

FIG. 7 is a flowchart illustrating a method for operating the serving system using the robot 100 according to an embodiment. Hereinafter, a method for operating the serving system using the robot 100 will be described in detail. The content duplicative of the above description may be omitted.

The robot 100 may set a target table 10 among the plurality of tables 10 (operation S110). When receiving a call from the caller 200, the robot 100 may set the table 10 on which the calling specific caller 200 has been mounted as a target. When a command to go to the specific table 10 is input through an inputter provided by the robot 100, the robot 100 may set the input table 10 as a target.

As described above, the robot 100 may store the information on the location of each of the plurality of callers 200, the size and shape of each of the plurality of tables 10, the location of the caller 200 mounted on the table 10, and the rotational angle with respect to the baseline of the caller 200.

The plurality of callers 200 may confirm the information on the location of the obstacle 30 in a restaurant capable of disturbing the driving of the robot 100, and transmit the confirmed information to the robot 100. The robot 100 may store the information on the location of the obstacle 30.

The robot 100 may generate the map for driving based on the stored information (operation S120). The map may include the information on the location and size of the table 10, and the location and size of the obstacle 30.

The robot 100 may generate the driving route on the map (operation S130). At this time, the robot 100 may generate the location of the obstacle 30 on the map, and set the driving route so as to avoid the obstacle 30 when setting the driving route.

The robot 100 may drive along the generated driving route (operation S140). The caller 200 may transmit to the robot 100 the information on the distance from the caller 200 to the robot 100 and the direction of the robot 100 with respect to the caller 200 during driving of the robot 100.

While the robot 100 is driving, the robot 100 may confirm its current location based on the information received from the caller 200 provided in each of the plurality of tables 10 (operation S150).

The caller 200 may transmit to the robot 100 the information on the distance from the caller 200 to the obstacle 30 appearing on the driving route of the robot 100 and the direction of the obstacle 30 with respect to the caller 200. The robot 100 may store the information on the obstacle 30 received from the caller 200.

The robot 100 may perform the SLAM by confirming its current location during driving and confirming the features such as the table 10 and the obstacle 30 on the driving route based on the information received from the caller 200.

The robot 100 may confirm the changed arrangement of the table 10 by receiving the information on at least one of the change in the location of the caller 200 or the rotational angle with respect to the baseline from the caller 200.

The robot 100 may store the information on the changed arrangement of the table 10. The stored information may update the existing information stored by the robot 100. The robot 100 may generate a new map for autonomous driving based on the updated information, and generate a driving route based on the newly generated map.

After driving along the driving route to reach the target table 10, the robot 100 may perform the necessary task in the target table 10. After the task has been completed, the robot 100 may return to the original location again.

The method of returning to the original location is performed by a method for generating the map, generating the driving route on the map, and driving along the driving route by the robot 100, similar to the method in which the robot 100 moves from the original location to the target table 10.

Hereinafter, an AI device, an AI server, and an AI system related to an embodiment will be described.

Figure 8:
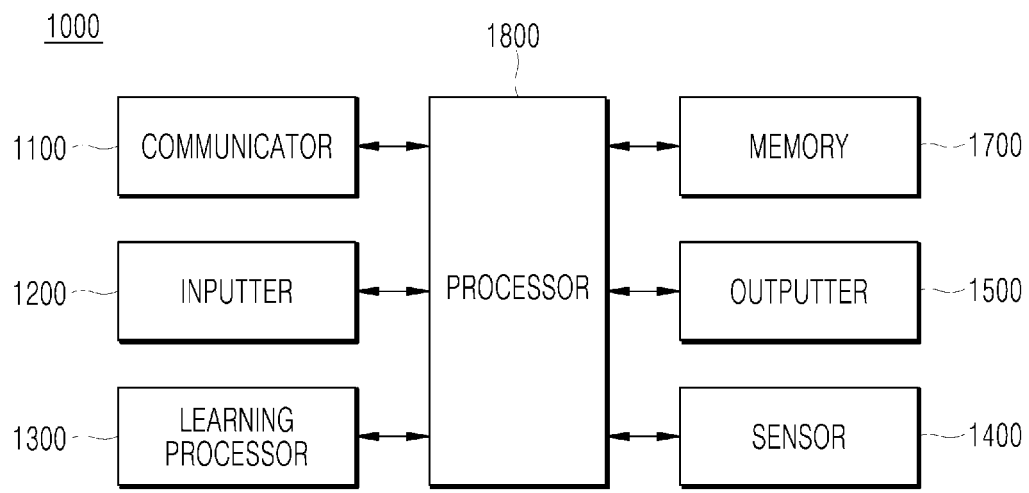
FIG. 8 is a diagram illustrating an AI device according to an embodiment.

FIG. 8 is a diagram illustrating an AI device 1000 according to an embodiment.

The AI device 1000 may be implemented by a fixed device or a moveable device, etc., such as a TV, a projector, a mobile phone, a smartphone, a desktop computer, a notebook, a digital broadcasting terminal, a personal digital assistant (PDA), a portable multimedia player (PMP), a navigation, a tablet PC, a wearable device, and a set-top box (STB), a DMB receiver, a radio, a washing machine, a refrigerator, a desktop computer, a digital signage, a robot, or a vehicle.

Referring to FIG. 8, the terminal 1000 may include a communicator 1100, an inputter 1200, a learning processor 1300, a sensor 1400, an outputter 1500, a memory 1700, a processor 1800, etc.

The communicator 1100 may transmit and receive data with external devices such as the other AI devices 1000a to 1000e or an AI server 2000 by using wired or wireless communication technology. For example, the communicator 1100 may transmit or receive sensor data, a user input, a trained model, a control signal, and the like with the external devices.

In this case, the communications technology used by the communicator 1100 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The inputter 1200 may obtain various types of data.

The inputter 1200 may include a camera for inputting an image signal, a microphone for receiving an audio signal, and a user inputter for receiving information inputted from a user. Here, the signal obtained from the camera or the microphone may also be referred to as sensing data or sensor information by treating the camera or the microphone as a sensor.

The inputter 1200 may acquire various kinds of data, such as learning data for model learning and input data used when an output is acquired using a trained model. The inputter 1200 may also obtain raw input data, and in this case, the processor 1800 or the learning processor 1300 may extract an input feature as preprocessing for the input data.

The learning processor 1300 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 1300 may perform AI processing together with a learning processor 2400 of the AI server 2000.

The learning processor 1300 may include a memory which is combined or implemented in the AI device 1000. Alternatively, the learning processor 1300 may be implemented using the memory 1700, an external memory directly coupled to the AI device 1000, or a memory maintained in an external device.

The sensor 1400 may obtain at least one of internal information of the AI device 1000, surrounding environment information of the AI device 1000, and user information by using various sensors.

At this time, the sensor included in the sensor 1400 may include at least one of a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, a LiDAR, a radar, etc.

The outputter 1500 may generate an output related to visual, auditory, or tactile, etc.

At this time, the outputter 1500 may include a display unit for outputting visual information, a speaker for outputting auditory information, a haptic module for outputting tactile information, etc.

The memory 1700 may store data supporting various functions of the AI device 1000. For example, the memory 1700 may store input data, learning data, learning model, learning history, etc. obtained from the inputter 1200.

The processor 1800 may determine at least one executable operation of the AI device 1000 based on the information determined or generated by using a data analysis algorithm or a machine learning algorithm. In addition, the processor 1800 may perform the determined operation by controlling the components of the AI device 1000.

For this purpose, the processor 1800 may request, search, receive, or utilize data of the learning processor 1300 or the memory 1700, and control the components of the AI device 1000 so as to execute an operation predicted or an operation determined to be preferable among at least one executable operation.

At this time, when the external device needs to be connected to perform the determined operation, the processor 1800 may generate a control signal for controlling the corresponding external device, and transmit the generated control signal to the corresponding external device.

The processor 1800 may obtain intention information with respect to a user input, and determine the requirement of the user based on the obtained intention information.

At this time, the processor 1800 may obtain the intention information corresponding to the user input by using at least one of a Speech To Text (STT) engine for converting a speech input into a string or a Natural Language Processing (NLP) engine for obtaining the intention information of a natural language.

At this time, at least one of the STT engine or the NLP engine may be composed of an artificial neural network at least partially learned according to the machine learning algorithm. In addition, at least one of the STT engine or the NLP engine may be learned by the learning processor 1300, may be learned by the learning processor 2400 of the AI server 2000, or may be learned by distributed processing thereof.

The processor 1800 may store it in the memory 1700 or the learning processor 1300 by collecting history information including the operation content of the AI device 1000 or the user feedback on the operation, or transmit it to the external device such as the AI server 2000, etc. The collected history information may be used to update the learning model.

The processor 1800 may control at least some of the components of the AI device 1000 in order to drive an application program stored in the memory 1700. In addition, the processor 1800 may combine and operate two or more of the components included in the AI device 1000 in order to drive the application program.

Figure 9:
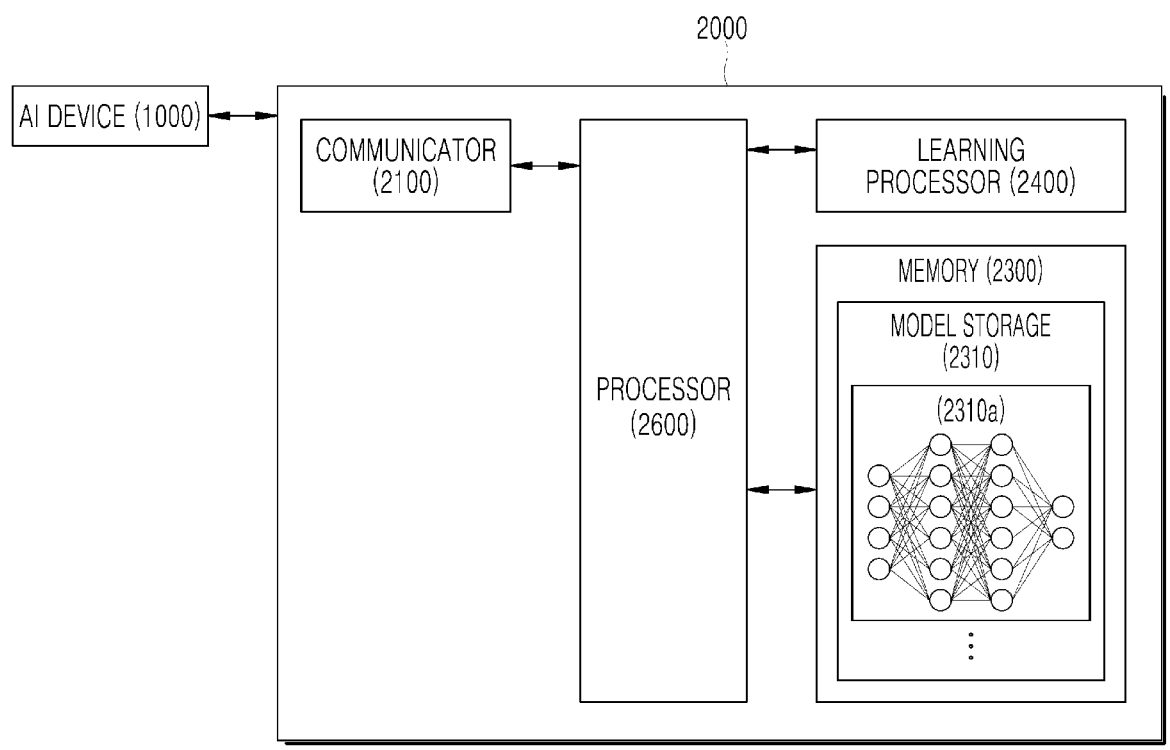
FIG. 9 is a diagram illustrating an AI server according to an embodiment.

FIG. 9 is a diagram illustrating an AI server 2000 according to an embodiment.

Referring to FIG. 9, the AI server 2000 may refer to a device for learning an artificial neural network by using the machine learning algorithm or using the learned artificial neural network. Here, the AI server 2000 may include a plurality of servers to perform distributed processing, and may be defined as a 5G network. In this case, the AI server 2000 may be included as a configuration of a portion of the AI device 1000, and may thus perform at least a portion of the AI processing together.

The AI server 2000 may include a communicator 2100, a memory 2300, a learning processor 2400, a processor 2600, etc.

The communicator 2100 may transmit and receive data with an external device such as the AI device 1000.

The memory 2300 may include a model storage 2310. The model storage 2310 may store a model being learned or learned (or artificial neural network 2310a) through the learning processor 2400.

The learning processor 2400 may learn the artificial neural network 2310a by using the learning data. The learning model may be used in a state where the model is mounted in the AI server 2000 of the artificial neural network, or used in a state where the model is mounted in an external device such as the AI device 1000.

The learning model may be implemented in hardware, software or a combination of hardware and software. When some or all of the learning models are implemented in software, one or more instructions constituting the learning model may be stored in the memory 2300.

The processor 2600 may infer a result value with respect to the new input data by using the learning model, and generate a response or control command based on the inferred result value.

Figure 10:
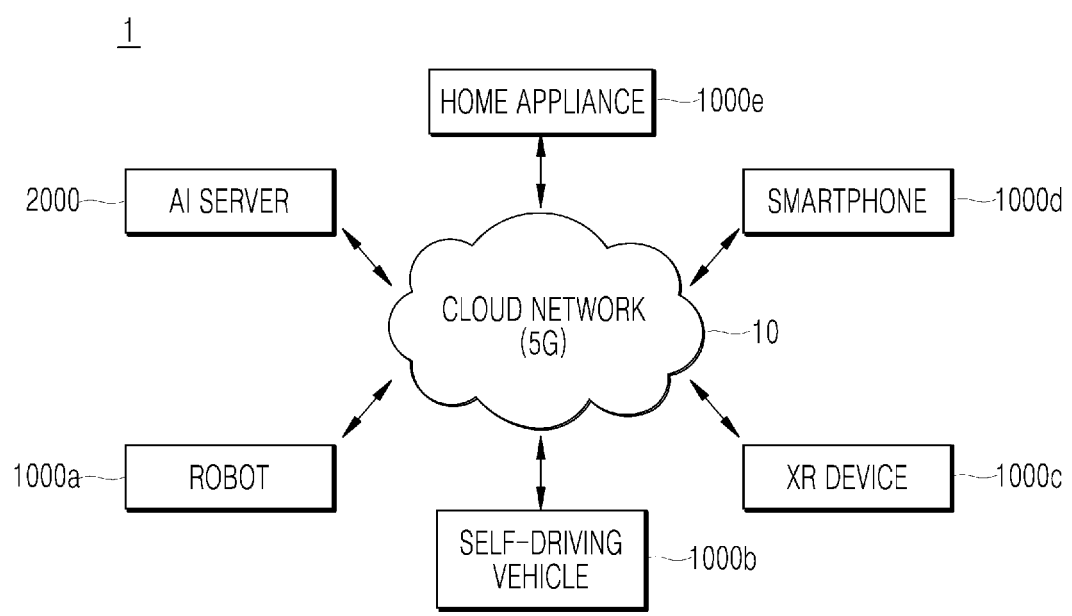
FIG. 10 is a diagram illustrating an AI system according to an embodiment.

FIG. 10 is a diagram illustrating an AI system 1 according to an embodiment.

Referring to FIG. 10, the AI system 1 may have at least one among the AI server 2000, a robot 1000*a*, an autonomous driving vehicle 1000*b*, an XR device 1000*c*, a smartphone 1000*d*, or a home appliance 1000*e* connected with a cloud network 10. Here, the robot 1000*a*, the autonomous driving vehicle 1000*b*, the XR device 1000*c*, the smartphone 1000*d*, or the home appliance 1000*e*, to which the AI technology has been applied, may be referred to as the AI devices 1000*a* to 1000*e*.

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (1000*a* to 1000*e*, 2000) constituting the AI system 1 may be connected to each other through the cloud network 10. In particular, each individual device (1000*a* to 1000*e*, 2000) may communicate with each other through the base station but may communicate directly to each other without relying on the base station.

The AI server 2000 may include a server performing AI processing and a server performing computations on big data.

The AI server 2000 may be connected with at least one among the robot 1000*a*, the autonomous driving vehicle 1000*b*, the XR device 1000*c*, the smartphone 1000*d*, or the home appliance 1000*e* that are the AI devices constituting the AI system 1 through the cloud network 10, and at least partially assist the AI processing of the connected AI devices 1000*a* to 1000*e*.

At this time, the AI server 2000 may learn the artificial neural network according to the machine learning algorithm on behalf of the AI devices 1000*a* to 1000*e*, and directly store the learning model or transmit the learning model to the AI devices 1000*a* to 1000*e*.

At this time, the AI server 2000 may receive input data from the AI device 1000*a* to 1000*e*, infer a result value from the received input data by using the learning model, generate a response or control command based on the inferred result value, and transmit the generated response or control command to the AI device 1000*a* to 1000*e*.

Similarly, the AI device 1000*a* to 1000*e* may infer a result value from the input data by employing the learning model directly and generate a response or control command based on the inferred result value.

Although only some embodiments were described above, other various embodiments may be possible. The technical contents of the embodiments described above may be combined in various methods unless they are not compatible, therefore new embodiments may be achieved.

What is claimed is:

1. A serving system including a robot, the serving system comprising:
    a plurality of callers respectively mounted on a plurality of tables; and
    a robot configured to move to the plurality of tables based on information received from the plurality of callers,
    wherein the robot stores information regarding locations of each of the plurality of callers, a size and shape of each of the plurality of tables, a respective location of each of the plurality of callers with respect to a corresponding table, and a respective rotational angle of each of the plurality of tables with respect to a baseline alignment of a corresponding caller, and
    wherein each of the plurality of callers is configured to transmit to the robot information on a respective distance from the caller to the robot and a respective direction of the robot with respect to the caller during movement of the robot.

2. The serving system of claim 1, wherein each caller comprises:
    an input for calling the robot;
    a positioning sensor configured to:
        sense the respective distance from the respective caller to the robot;
        sense the respective direction of the robot with respect to the respective caller;
        sense respective distances to each of the other plurality of callers; and
        sense a respective direction of each of the other plurality of callers;
    a magnetic sensor configured to sense a rotational angle; and
    a communicator configured to communicate with the robot.

3. The serving system of claim 2, wherein the positioning sensor is an Ultra Wide Band (UWB) sensor.

4. The serving system of claim 2, wherein the robot is configured to generate a map comprising an arrangement of each of the plurality of tables based on the stored information.

5. The serving system of claim 4, wherein the robot is further configured to generate a driving route for moving to a particular caller based on the generated map when a calling signal is received from the particular caller.

6. The serving system of claim 4, wherein the robot is further configured to generate the map based on the locations of the plurality of callers, the size and shape of each of the plurality of tables, and the respective rotational angle of each of the plurality of tables with respect to the baseline alignment of the corresponding caller which are derived from the stored information.

7. The serving system of claim 2, wherein the robot is configured to confirm its current location based on information on a distance from a particular caller to the robot and a direction of the robot with respect to the particular caller during movement.

8. The serving system of claim 2, wherein each caller is further configured to transmit to the robot information on a location of an obstacle on a driving route of the robot to the respective caller.

9. The serving system of claim 8, wherein the transmitted information further includes information on a distance from the respective caller to the obstacle and a direction of the obstacle with respect to the respective caller.

10. The serving system of claim 1, wherein the robot is further configured to determine a change in an arrangement of the plurality of tables based on receiving information on a change in a location of one of the plurality of callers or a change in a rotational angle of a table with respect to the baseline alignment of the corresponding caller.

11. The serving system of claim 10, wherein the robot is further configured to store the received information related to the changed arrangement of the plurality of tables.

12. The serving system of claim 1, wherein the robot further comprises an input and is further configured to set a target table among the plurality of tables and generate a driving route according to an input received via the input or a call received from a particular caller of the plurality of callers.

13. A method for operating a serving system including a robot, the method comprising:
setting a particular table among a plurality of tables as a target table;
generating a map for driving based on stored information;
generating a driving route based on the generated the map;
driving along the generated driving route;
receiving information, respectively from each of a plurality of callers located at the plurality of tables, on a distance from the respective caller to the robot and a direction of the robot with respect to the respective caller;
confirming a current location of the robot during movement of the robot, wherein the current location is confirmed based on the received information,
wherein the stored information comprises locations of each of the plurality of callers, a size and shape of each of the plurality of tables, a respective location of each of the plurality of the callers with respect to a corresponding table, and a respective rotational angle of each of the plurality of tables with respect to a baseline alignment of a corresponding caller.

14. The method of claim 13, further comprising:
determining a change in an arrangement of the plurality of tables based on receiving information on a change in a location of one of the plurality of callers or a change in a rotational angle of a table with respect to the baseline alignment of the corresponding caller; and
storing information of the determined change in a memory.

15. The method of claim 13, further comprising:
receiving, from a particular caller, obstacle information on a distance from the particular caller to an obstacle on a driving route of the robot and a direction of the obstacle with respect to the particular caller; and
storing the received obstacle information in a memory.

* * * * *